(12) United States Patent
Chou

(10) Patent No.: US 7,804,206 B2
(45) Date of Patent: Sep. 28, 2010

(54) TWO-DIMENSION LINEAR PLATFORM

(75) Inventor: Chi-Pin Chou, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 298 days.

(21) Appl. No.: 12/025,049

(22) Filed: Feb. 3, 2008

(65) Prior Publication Data

US 2009/0193924 A1 Aug. 6, 2009

(51) Int. Cl.
H02K 41/00 (2006.01)
(52) U.S. Cl. .................................. 310/12.01
(58) Field of Classification Search .............. 310/12.01, 310/12.05, 12.13, 12.15
See application file for complete search history.

(56) References Cited

U.S. PATENT DOCUMENTS 6,538,348 B2 * 3/2003 Sawai et al. ............. 310/12.06
6,798,088 B2 * 9/2004 Hsu et al. ................ 310/12.13
6,891,597 B2 * 5/2005 Sekiguchi .................... 355/53
7,133,115 B2 * 11/2006 Nawata et al. ................ 355/53

* cited by examiner

Primary Examiner—Nguyen N Hanh
(74) Attorney, Agent, or Firm—Banger Shia

(57) ABSTRACT

A two-dimension linear platform comprises a first displacement module and a second displacement module. The first displacement module includes a carrying member, at least one active linear module and at least one passive linear module. The active linear module and the passive linear module of the first displacement are parallel and opposite each other and are both disposed on the carrying member of the first displacement module. The second displacement module includes a carrying member, at least one active linear module and at least one passive linear module. The carrying member of the second displacement module is disposed on the active linear module and the passive linear module of the first displacement module. The active linear module and the passive linear module of the second displacement module are parallel and opposite each other and are disposed on the carrying member of the second displacement module.

6 Claims, 5 Drawing Sheets

TWO-DIMENSION LINEAR PLATFORM

BACKGROUND OF THE INVENTION

1. Field of the Invention

The present invention relates to an automatic platform, and more particularly to a two-dimension linear platform.

2. Description of the Prior Art

By using the automatic platforms, it can not only save manpower, but also accelerate production. The common automatic platforms can be divided into mechanical platforms and pneumatic platforms.

The mechanical platforms are likely to create dust and scraps when they are running. As to the working area where the dust fall amount is strictly restricted, the foreign bodies will cause direct damage to the products, lowering the production yield.

When the pneumatic platforms run, it must need an apparatus to produce the air pressure, thus not only wasting cost to purchase the apparatus, but causing inconvenience due to the sequent maintenance of the apparatus.

The present invention has arisen to mitigate and/or obviate the afore-described disadvantages.

SUMMARY OF THE INVENTION

The primary objective of the present invention is to provide a two-dimension linear platform capable of performing the two-dimension movement (X-axis, Y-axis) through the magnetic induction.

In order to achieve the above objective, the two-dimension linear platform in accordance with the present invention comprises a first displacement module and a second displacement module.

The first displacement module includes a carrying member and at least one active linear module disposed on the carrying member thereof.

The second displacement module includes a carrying member and at least one active linear module. The carrying member of the second displacement module is disposed on the active linear module of the first displacement module. The active linear module of the second displacement is disposed on the carrying member of the second displacement module.

The above first displacement module further includes a passive linear module which is parallel and opposite the active linear module of the first displacement module and is disposed between the carrying member of the first displacement module and the carrying member of the second displacement module.

The above second displacement module further includes a passive linear module which is parallel and opposite the active linear module of the second displacement module and is disposed on the carrying member of the second displacement module.

Further analysis shows that the present invention has the following advantages:

1. The two-dimension platform is driven by magnetic force, so the occurrence of the dust and scraps can be avoided, thus preventing the foreign bodies from directly damaging the products, and improving the production yield;

2. The two-dimension platform is driven by magnetic force without wasting extra cost to purchase the apparatus for producing air pressure, thus reducing the cost.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
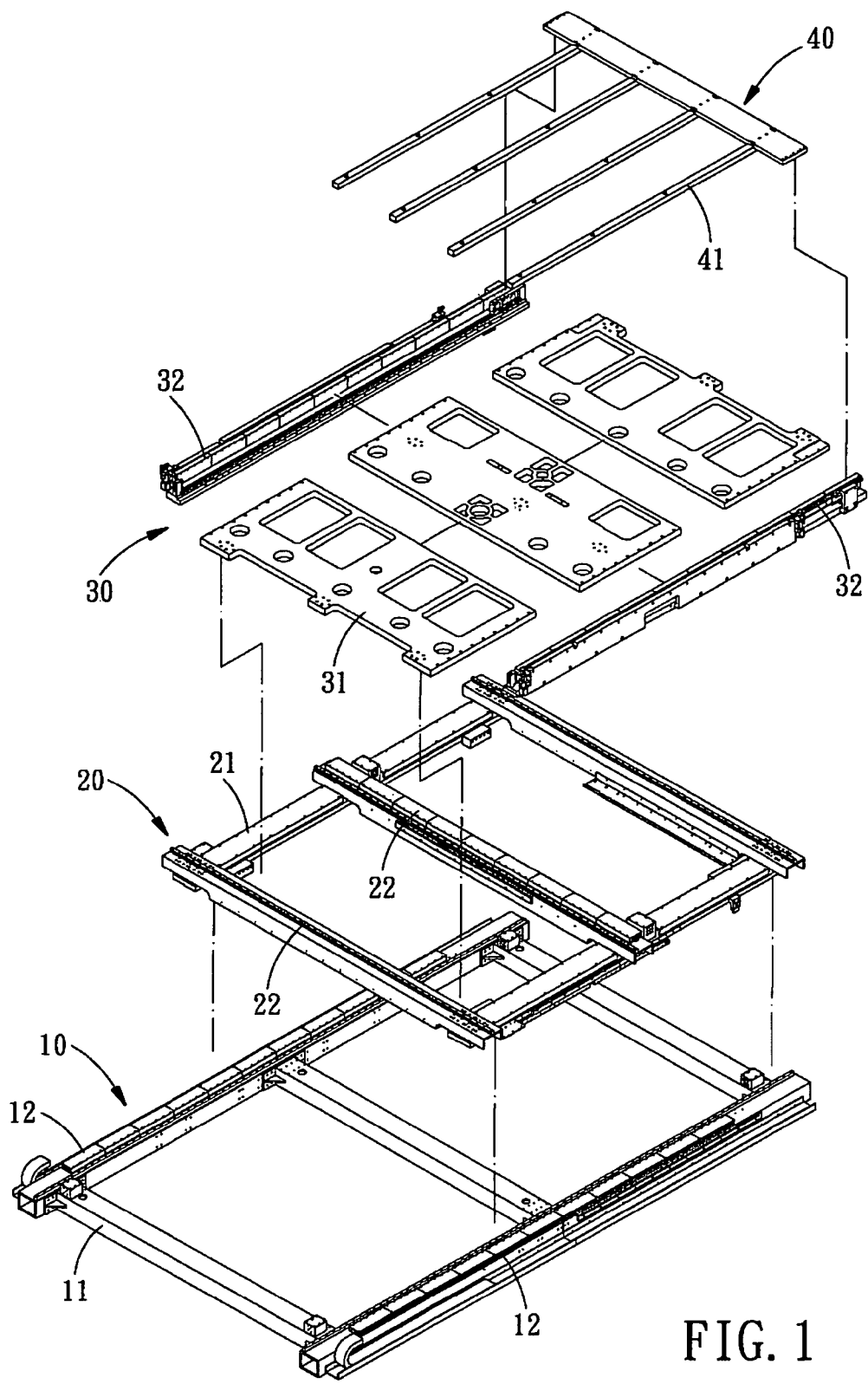
FIG. 1 is an exploded view of a two-dimension platform in accordance with the present invention.

Referring to FIG. 1, a two-dimension linear platform in accordance with the present invention comprises a first displacement module 10, a second displacement module 20, a third displacement module 30 and a fourth displacement module 40.

The first displacement module 10 includes a carrying member 11 and at least one linear module 12.

The carrying member 11 can be block-shaped or frame-shaped.

The linear module 12 can be an active linear module 13 or a passive linear module 15. Both sides of the carrying member 11 are disposed with the active linear modules 13.

Figure 2:
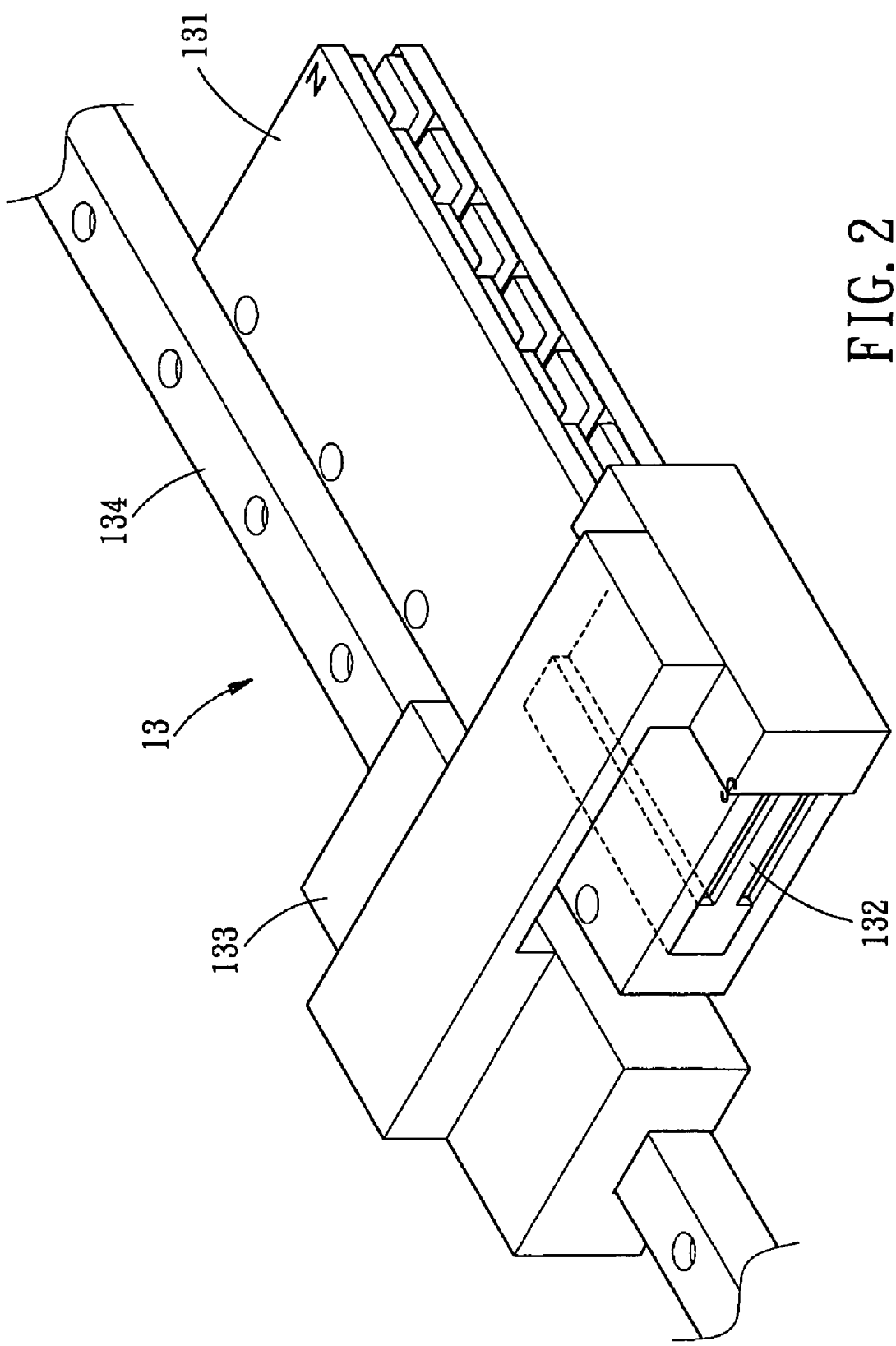
FIG. 2 is a perspective view of an active linear module in accordance with the present invention.

The active linear module 13 (as shown in FIG. 2) includes a stator 131, a mover 132, a slide block 133 and a slide seat 134. The stator 131 is disposed with a plurality of magnets. The mover 132 magnetically interacts with the stator 131 and moves along the stator 131. The slide block 133 is slidably disposed on the slide seat 134 and connected to the mover 132. When the mover moves with respect to the stator 131, the mover 132 is enabled to synchronously drive the slide block 133 to slide on the slide seat 134. The active linear module 13 is driven by the magnetic force.

Figure 3:
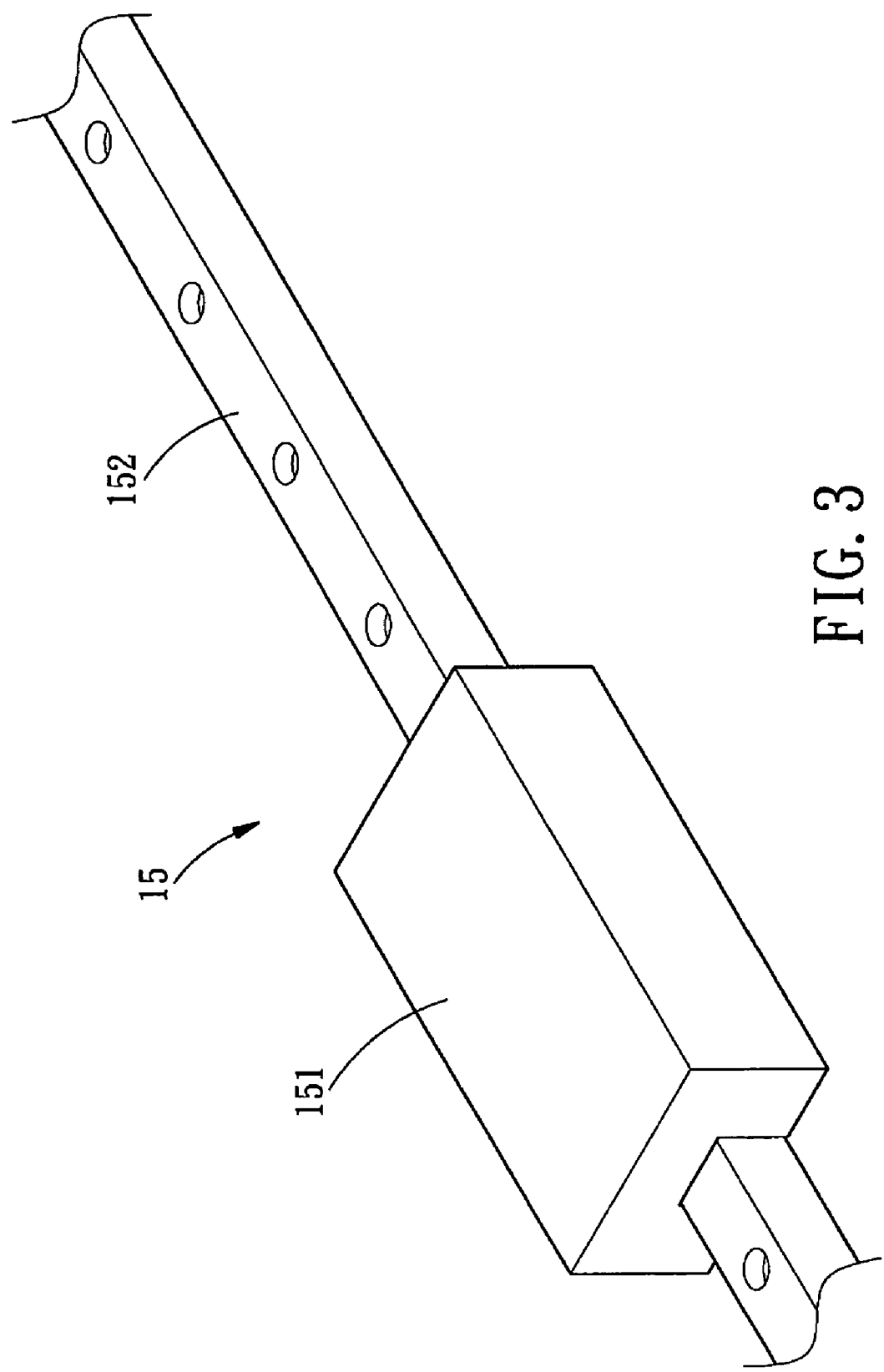
FIG. 3 is a perspective view of a passive linear module in accordance with the present invention.
Figure 4:
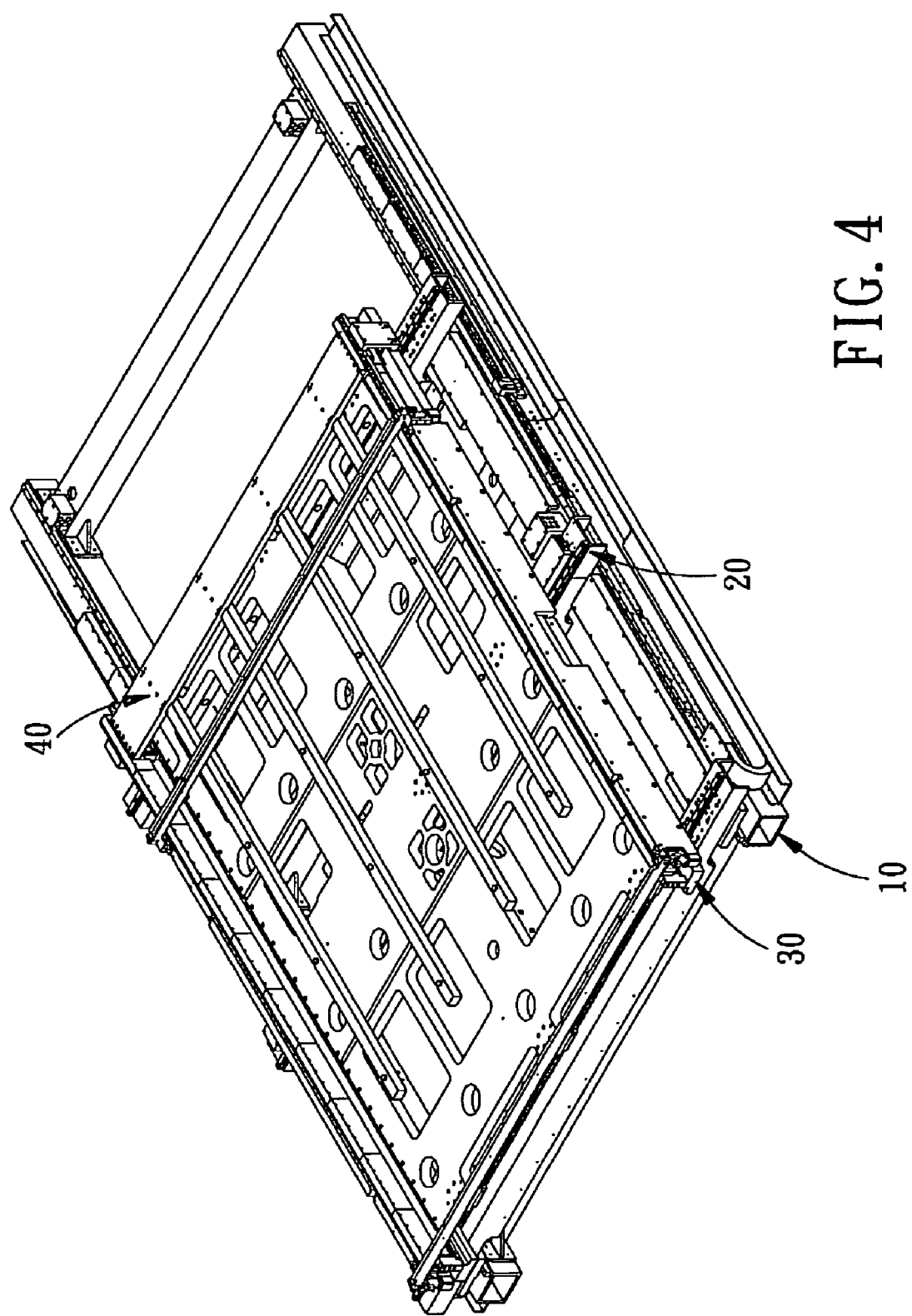
FIG. 4 is a perspective view of the two-dimension linear platform in accordance with the present invention.
Figure 5:
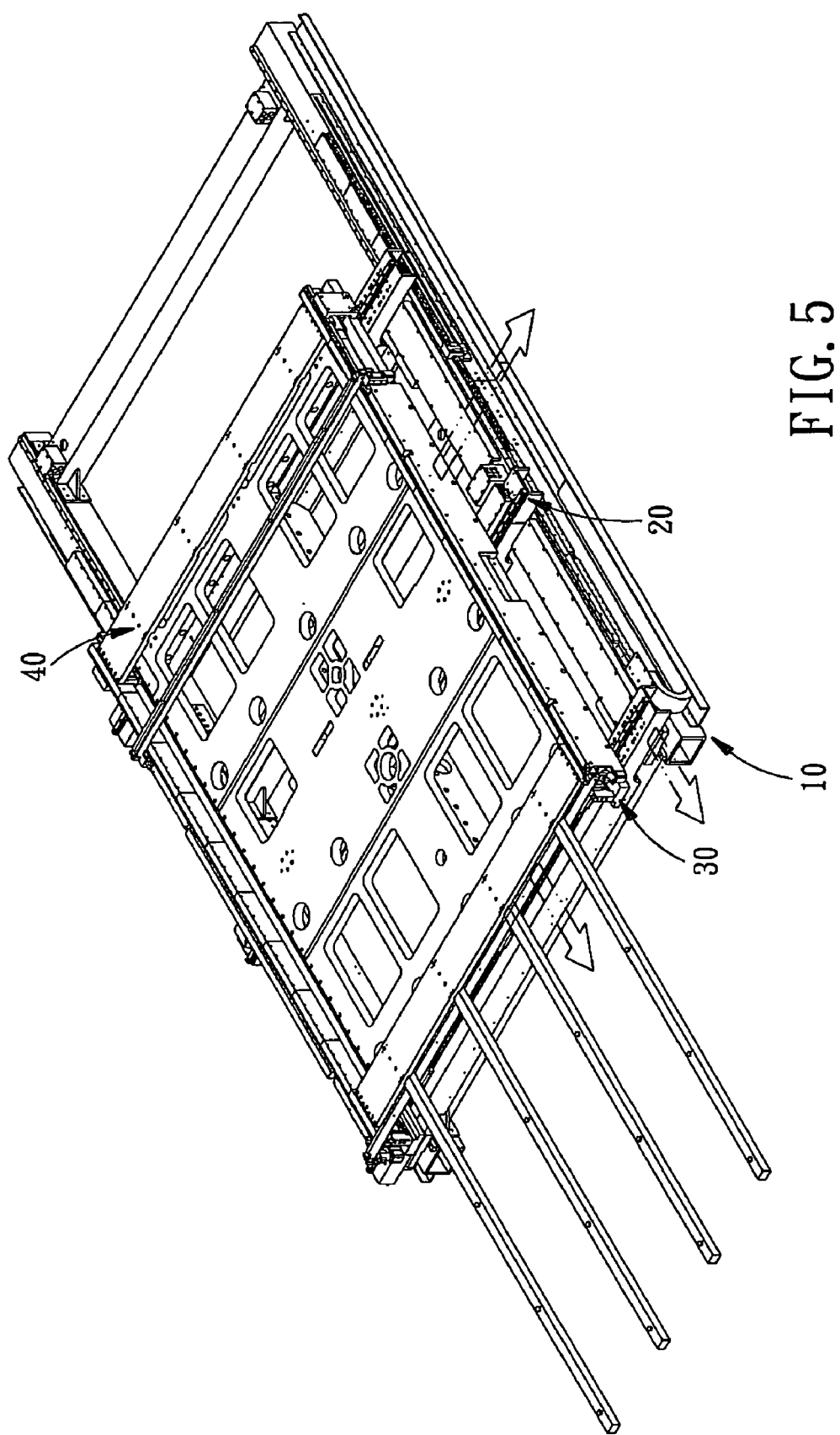
FIG. 5 is an operational view of the two-dimension linear platform in accordance with the present invention.

The passive linear module 15 (as shown in FIG. 3) includes a slide block 151 and a slide rail 152. The slide block 151 is slidably disposed on the slide rail 152. If the passive linear module 15 is used, the active linear module 13 must also be employed together, so one side of the carrying member 11 is disposed with the active linear module 13, and the other side of the carrying member 11 is disposed with the passive linear module 15.

The second displacement module 20 includes a carrying member 21 and at least one linear module 22.

The carrying member 21 can be block-shaped or frame-shaped.

The linear module 22 can be an active linear module 23 and a passive linear module 25. The active linear module 23 is driven by magnetic force, and the driving components and its operation principle are the same as that of the active linear module 13 of the first displacement module 10. Both sides of the carrying member 21 are disposed with the active linear modules 23, and the active linear modules 12 are provided for installing the carrying member 11 of the first displacement module 10.

The driving components and its operation principle of the passive linear module 25 are the same as that of the passive linear module 15. If the passive linear module 25 is used, the active linear module 23 must also be employed together, so one side of the carrying member 21 is disposed with the active linear module 23, and the other side of the carrying member 21 is disposed with the passive linear module 25. The two linear modules 23, 25 are provided for installing the carrying member 11 of the first displacement module 10. The moving direction of the second displacement module 20 after the passive linear module 25 and the active linear module 23 are installed intersects the moving direction of the first displacement module 10 after the passive linear module 15 and the active linear module 13 are installed.

The third displacement module 30 includes a carrying member 31 and at least one linear module 32.

The carrying member 31 can be block-shaped or frame-shaped.

The linear module 32 can be an active linear module 33 and a passive linear module 35. The active linear module 33 is driven by magnetic force, and the driving components and its operation principle of the active linear module 33 are the same as that of the active linear module 13 of the first displacement module 10. Both sides of the carrying member 31 are disposed with the active linear modules 33, and the active linear modules 33 are provided for installing the carrying member 21 of the second displacement module 20.

The driving components and its operation principle of the passive linear module 35 are the same as that of the passive linear module 25. If the passive linear module 35 is used, the active linear module 33 must also be employed together, so one side of the carrying member 31 is disposed with the active linear module 33, and the other side of the carrying member 31 is disposed with the passive linear module 35. The two linear modules 33, 35 are provided for installing the carrying member 21 of the first displacement module 20. The moving direction of the third displacement module 30 after the passive linear module 35 and the active linear module 33 are installed intersects the moving direction of the second displacement module 20 after the passive linear module 25 and the active linear module 23 are installed.

The fourth displacement module 40 includes a carrying member 41, and the carrying member 41 can be frame-shaped or block-shaped. Both sides of the carrying member 41 are installed on the linear modules 32 of the third displacement module 30.

The aforementioned is the summary of the positional and structural relationship of the respective components of the preferred embodiment in accordance with the present invention.

For a better understanding of the present invention, its operation and function, reference should be made to FIGS. 1-5:

When the mover 132 of the active linear module 13 of the first displacement module 10 moves, the slide block 133 of the active linear module 13 and the slide block 151 of the passive linear module 15 are synchronously driven to move, thus enabling the carrying member 21 of the second displacement module 20 to move in the Y-axis direction.

When the mover 23 of the active linear module 23 of the second displacement module 20 moves, the slide block of the active linear module 23 and the slide block of the passive linear module 25 are synchronously driven to move, thus enabling the carrying member 31 of the third displacement module 30 to move in the X-axis direction.

When the mover of the active linear module 33 of the third displacement module 30 moves, the slide block of the active linear module 33 and the slide block of the passive linear module 35 are synchronously driven to move, thus enabling the carrying member 41 of the fourth displacement module 40 to move in the Y-axis direction.

To summarize, the present invention relates to a two-dimension platform which comprises a first displacement module and a second displacement module. The first displacement module includes a carrying member, at least one active linear module and at least one passive linear module. The active linear module of the first displacement module and the passive linear module of the first displacement module are parallel and opposite each other and are both disposed on the carrying member of the first displacement module. The second displacement module includes a carrying member, at least one active linear module and at least one passive linear module. The carrying member of the second displacement module is disposed on the active linear module and the passive linear module of the first displacement module. The active linear module of the second displacement module and the passive linear module of the second displacement module are parallel and opposite each other and are both disposed on the carrying member of the second displacement module and intersect the passive linear module of the first displacement module and the active linear module of the first displacement module, respectively.

While we have shown and described various embodiments in accordance with the present invention, it is clear to those skilled in the art that further embodiments may be made without departing from the scope of the present invention.

What is claimed is:

1. A two-dimension linear platform comprising:
    a first displacement module including a carrying member, at least one active linear module and at least one passive linear module, the active linear module of the first displacement module being disposed on the carrying member of the first displacement module and being driven to move by magnetic force, the passive linear module of the first displacement module being parallel and opposite the active linear module and being disposed on the carrying member of the first displacement module; and
    a second displacement module including a carrying member, at least one active linear module and at least one passive linear module, the carrying member of the second displacement module being disposed on the active linear module and the passive linear module of the first displacement module, so as to make the carrying member of the second displacement module horizontally move with the active linear module of the first displacement module, the active linear module of the second displacement module being disposed on the carrying member of the second displacement module and being driven to move by magnetic force, the passive linear module of the second displacement module being parallel and opposite the active linear module of the second displacement module and being disposed on the carrying member of the second displacement module, a moving direction of the second displacement module after the passive linear module and the active linear module of the second displacement module are installed intersecting a moving direction of the first displacement module after the passive linear module and the active linear module of the first displacement module are installed.

2. The two-dimension linear platform as claimed in claim 1, wherein:
    the active linear module of the first displacement module includes a stator, a mover, a slide block and a slide seat, the stator of the active linear module of the first displacement module is disposed on the carrying member of the first displacement module, the mover of the active linear module of the first displacement module magnetically interacts with the stator of the active linear module of the first displacement module and is enabled to move along the stator of the active linear module of the first displacement module, the slide block of the active linear module of the first displacement module is slidably disposed on the slide seat of the active linear module of the first displacement module and is connected to the mover of the active linear module of the first displacement module, so that the mover of the active linear module of the first displacement module moves synchronously with the slide block of the active linear module of the first displacement module, the passive linear module of the first displacement module includes a slide block and a slide rail, the slide rail of the passive linear module of the first displacement module is parallel and opposite the stator of the active linear module of the first displacement module and disposed on the carrying member of the first displacement module, the slide block of the passive linear module of the first displacement module is slidably disposed on the slide rail of the passive linear module of the first displacement module; and the carrying member of the second displacement module is disposed on the slide block of the active linear module of the first displacement module and the slide block of the passive linear module of the first displacement module, the active linear module of the second displacement module includes a stator, a mover, a slide block and a slide seat, the stator of the active linear module of the second displacement is disposed on the carrying member of the second displacement module, the mover of the active linear module of the second displacement module magnetically interacts with the stator of the active linear module of the second displacement module, the mover of the active linear module of the second displacement module is enabled to move along the stator of the active linear module of the second displacement module, the slide block of the active linear module of the second displacement module is slidably disposed on the slide seat of the active linear module of the second displacement module and is connected to the mover of the active linear module of the second displacement module, so that the mover of the active linear module of the second displacement module synchronously moves with the slide block of the active linear module of the second displacement module, the passive linear module of the second displacement module includes a slide block and a slide rail, the slide block of the passive linear module of the second displacement module is slidably disposed on the slide rail of the passive linear module of the second displacement module and carries the mover of the first displacement module.

3. The two-dimension linear platform as claimed in claim 2, wherein a third displacement module including a carrying member, at least one active linear module and at least one passive linear module is disposed on the second displacement module, the carrying member of the third displacement module is disposed on the slide block of the active linear module of the second displacement module and the slide block of the passive linear module of the second displacement module, the active linear module of the third displacement module includes a stator, a mover, a slide block and a slide seat, the stator of the active linear module of the third displacement module is disposed on the carrying member of the active linear module of the third displacement module, the mover of the active linear module of the third displacement module magnetically interacts with the stator of the active linear module of the third displacement module, the mover of the active linear module of the third displacement module is enabled to move along the stator of the active linear module of the third displacement module, the slide block of the active linear module of the third displacement module is slidably disposed on the slide seat of the active linear module of the third displacement module and is connected to mover of the active linear module of the third displacement module, so that the mover of the active linear module of the third displacement module moves synchronously with the slide block of the active linear module of the third displacement module, the passive linear module of the third displacement module includes a slide block and a slide rail, the slide block of the passive linear module of the third displacement module is slidably disposed on the slide rail of the passive linear module of the third displacement module and carries the mover of the second displacement module, a moving direction of the third displacement module after the passive linear module and the active linear module of the third displacement module are installed intersects the moving direction of the second displacement module after the passive linear module and the active linear module of the second displacement module are installed.

4. The two-dimension linear platform as claimed in claim 3, wherein a fourth displacement module including a carrying member is disposed on the third displacement module, the carrying member of the fourth displacement module is disposed on the slide block of the active linear module of the third displacement module and the slide block of the passive linear module of the third displacement module.

5. The two-dimension linear platform as claimed in claim 4, wherein the carrying member is block-shaped.

6. The two-dimension linear platform as claimed in claim 4, wherein the carrying member is frame-shaped.

* * * * *